United States Patent
Sizer

[11] Patent Number: 5,829,224
[45] Date of Patent: Nov. 3, 1998

[54] METHOD AND APPARATUS FOR PRODUCING AN ASEPTIC HETEROGENEOUS FOOD

[75] Inventor: Charles Sizer, Hawthorne Woods, Ill.

[73] Assignee: Tetra Laval Holdings & Finance, SA, Pully, Switzerland

[21] Appl. No.: 949,165

[22] Filed: Oct. 10, 1997

[51] Int. Cl.[6] .............................. B65B 55/00; B65B 3/00
[52] U.S. Cl. ................................ 53/127; 53/167; 53/237; 19/470; 19/453
[58] Field of Search .............................. 53/127, 154, 155, 53/167, 237, 239; 99/470, 472, 453, 454

[56] References Cited

U.S. PATENT DOCUMENTS

| | | |
|---|---|---|
| 3,973,048 | 8/1976 | Sollerud . |
| 4,782,643 | 11/1988 | Stark . |
| 4,850,270 | 7/1989 | Bronnert ................................. 99/470 |
| 4,874,021 | 10/1989 | Ringdahl et al. . |
| 5,085,882 | 2/1992 | Rausing . |

*Primary Examiner*—Linda Johnson
*Attorney, Agent, or Firm*—Michael A. Catania

[57] ABSTRACT

A method and apparatus for producing a heterogeneous food in a continuous aseptic thermal process is disclosed herein. The invention involves the combining of two streams of aseptically processed components of a final heterogeneous food product such as potato soup, yogurt or the like. One of the streams is a homogeneous component of the final product and the other stream is a heterogeneous component. The invention involves aseptically processing both streams, then using the homogeneous component or carrier fluid, to partially cool the heterogeneous food product. The invention allows for the holding of the heterogeneous component for a predetermined residence time at a predetermined temperature as set by FDA regulations. The final product may be packaged on an aseptic packaging machine.

8 Claims, 8 Drawing Sheets

METHOD AND APPARATUS FOR PRODUCING AN ASEPTIC HETEROGENEOUS FOOD

BACKGROUND OF THE INVENTION

1. Field of the Invention

The present invention relates to aseptic food processes. Specifically, the present invention relates to a method and apparatus for producing an aseptic heterogeneous food.

2. Description of the Related Art

Traditionally, shelf-stable soup has been packaged in a metal (tin) can due to thermal processing requirements. The soup is filled into the can and the can is sealed. The sealed can is placed on a rack with other cans, and the rack is rotated while being subjected to a predetermined temperature for sterilizing the product. Heterogeneous foods have been limited to such packaging technique because until recently this was the only process approved by the Food and Drug Administration ("FDA") for shelf-stable heterogeneous foods.

A continuous thermal process for sterilizing heterogeneous foods has recently been approved by the FDA. The process was previously used for homogeneous foods such as shelf-stable milk sold by PARMALAT® and packaged in TETRA BRIK® containers. The process maintains the heterogeneous food in a holding tube at a predetermined temperature for a predetermined time thereby effectively sterilizing the heterogeneous food.

The heterogeneous food generally consists of a viscous carrier and suspended particles. The carrier is heated by contact with the walls of the thermal process equipment, and this heat is then transferred to the suspended particles by conduction and convective heat transfer. Often, the carrier receives a thermal treatment in excess of what is necessary to sterilize it and is overcooked due to its prolonged exposure to the high temperature. The particles may also be overcooked due to the time that is required to cool the heterogeneous food using heat exchangers to a packaging temperature once the heterogeneous food has been maintained for the predetermined time period at the predetermined temperature in the holding tube.

The FDA approval for this process requires that the heterogeneous food be maintained for the predetermined time period at the predetermined temperature in the holding tube. Thus, any attempt to cool the heterogeneous food must be able to include that holding tube time period while maintaining the aseptic nature of the processing system. This problem has not previously been addressed by the packaging industry because of the lack of FDA approval for a continuous processing system until recently.

BRIEF SUMMARY OF THE INVENTION

The present invention resolves this overcooking problem while maintaining the aseptic nature of the processing and packaging of the heterogeneous food. The present invention accomplishes this by providing a second aseptic processing system which is in flow communication with the first aseptic processing system. The second aseptic processing system processes a carrier fluid which is a thermal sensitive component of the final heterogeneous food product. The carrier fluid is cooled to a second predetermined temperature before being combined with the heterogeneous food. In this manner the carrier fluid cools the heterogeneous food without destroying the aseptic processing and aseptic packaging of the heterogeneous food. Examples of such heterogeneous foods include soups, yogurt with fruit particles, macaroni and cheese, and the like.

One aspect of the present invention is a method for producing an aseptic heterogeneous food. The first step is introducing a heterogeneous food to an aseptic processing system. The next step is heating the heterogeneous food to a first predetermined temperature in a heater within the aseptic processing system. The next step is holding the heterogeneous food in a holding tube at the first predetermined temperature for a predetermined time period. The next step is introducing a sterile, cold carrier fluid to combine with the heterogeneous food product subsequent to the predetermined time period to form a final food product. The next step is mixing the carrier into the heterogeneous food. The next step is cooling the final food product subsequent to the holding tube. The final step is aseptically packaging the final food product.

Another aspect of the present invention is an apparatus for producing an aseptically processed heterogeneous food. The apparatus includes a first aseptic processing system and a second aseptic processing system. The first system has a holding tube for maintaining a heterogeneous food at a first predetermined temperature for, a predetermined time period. The second aseptic processing system is in flow communication with the first aseptic processing system in order to combine a carrier food product with the heterogeneous food subsequent to the predetermined time period.

Yet another aspect of the present invention is an apparatus for producing a aseptically processed soup. The apparatus includes a first aseptic processing system and a second aseptic processing system. The first aseptic processing system includes a holding tube for maintaining the soup at a predetermined temperature for a time period sufficient to sterilizes the soup. The second aseptic processing system sterilizes a carrier fluid of the soup. The second aseptic processing system is in flow communication with the first aseptic processing system for combining the carrier fluid with soup. The carrier fluid has a temperature lower than that of the predetermined temperature.

It is a primary object of the present invention to provide a method and apparatus for producing an aseptically processed heterogeneous food.

It is an additional object of the present invention to provide a method and apparatus for producing an aseptically processed soup.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a schematic diagram of the preferred embodiment of the present invention;

Figure 2:
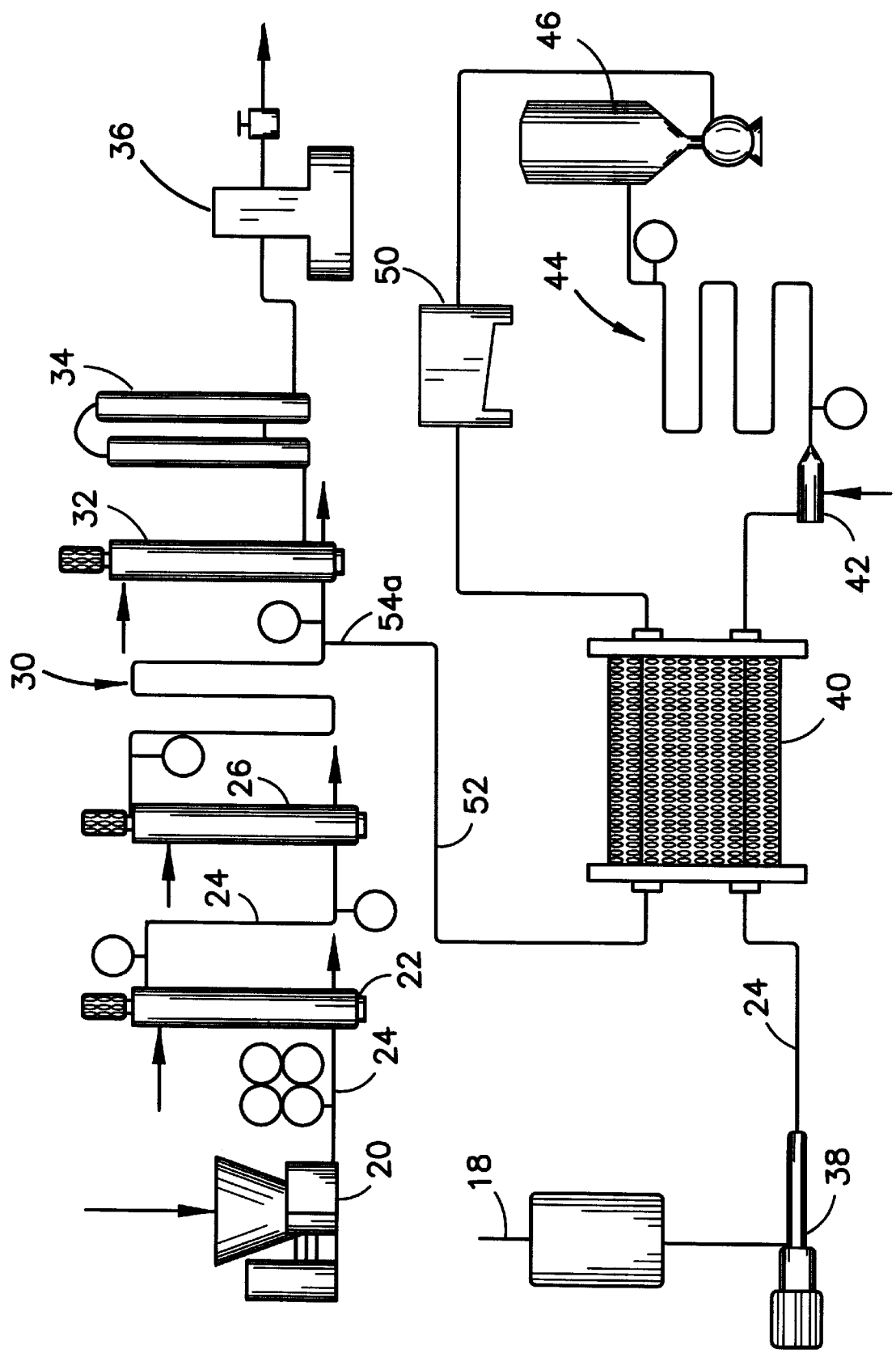
Figure 3:
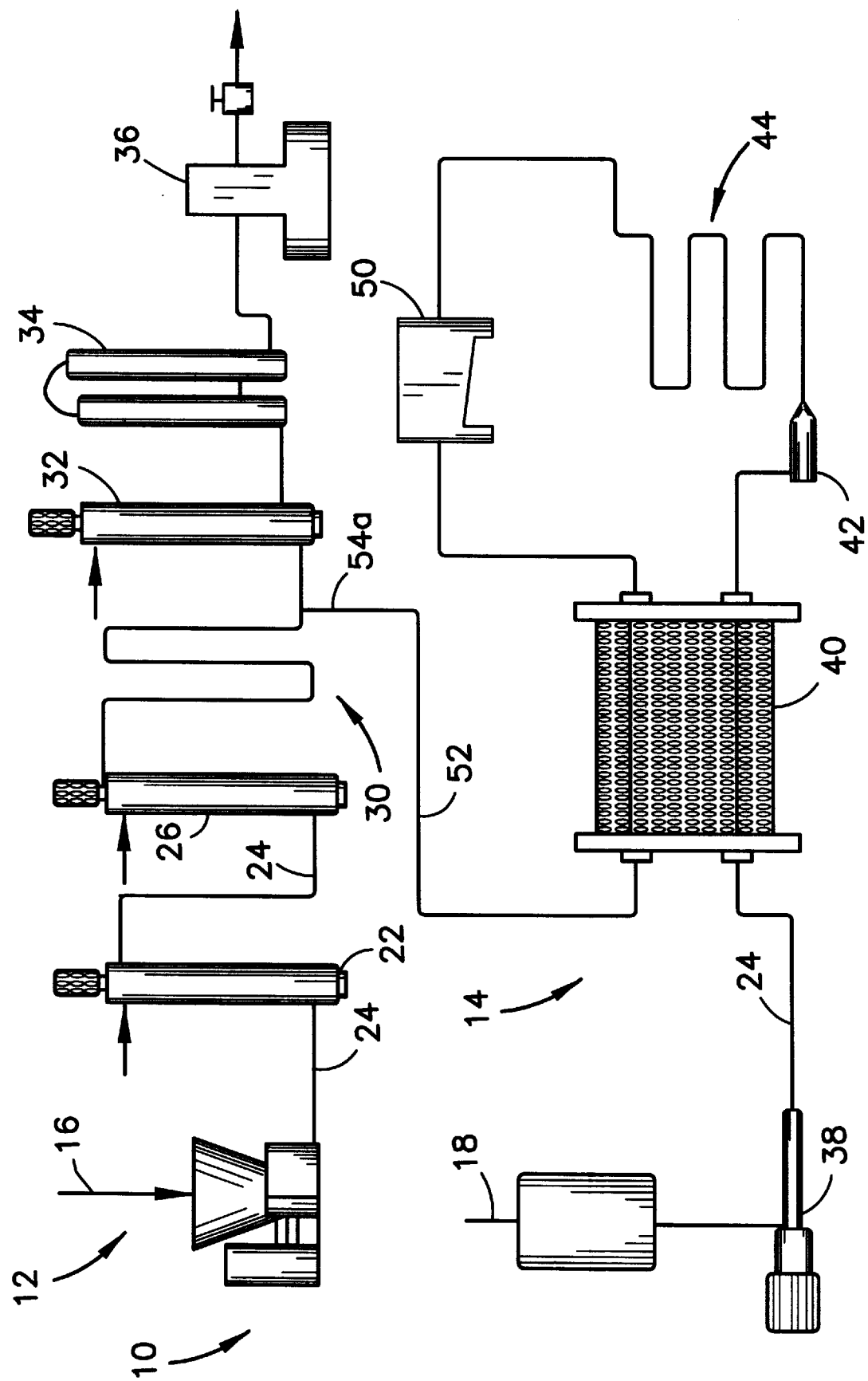
Figure 4:
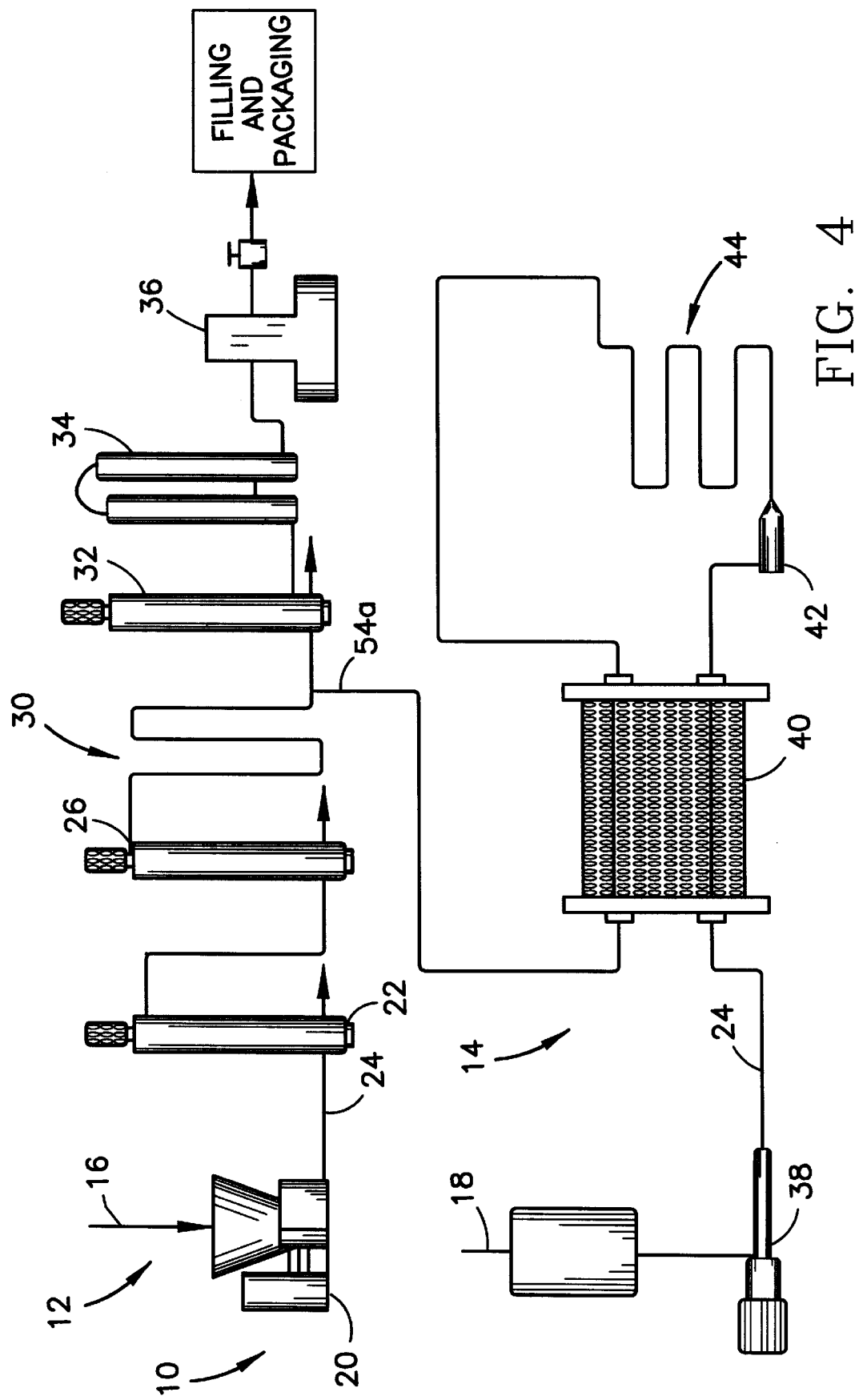
Figure 5:
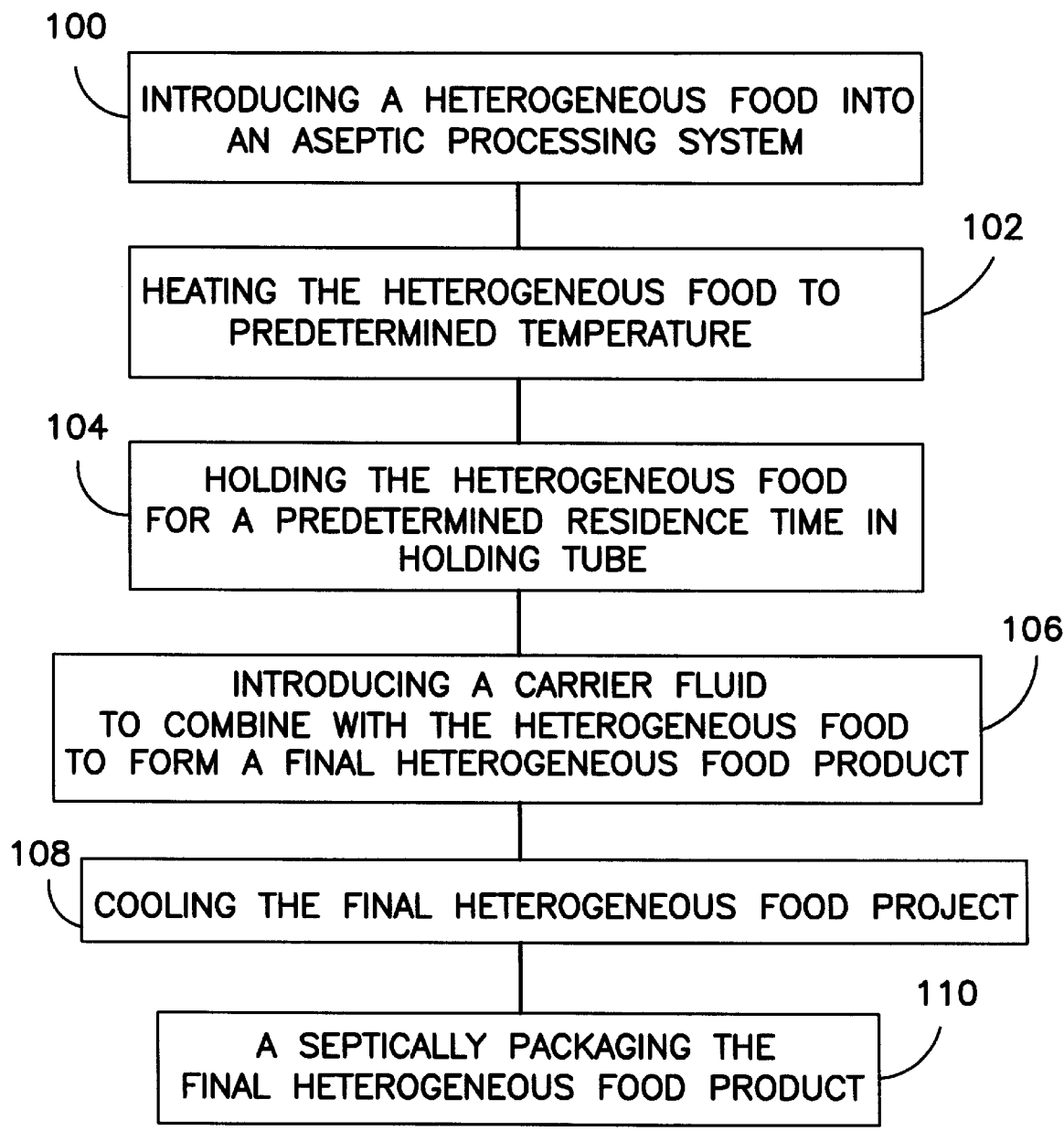
Figure 6A:
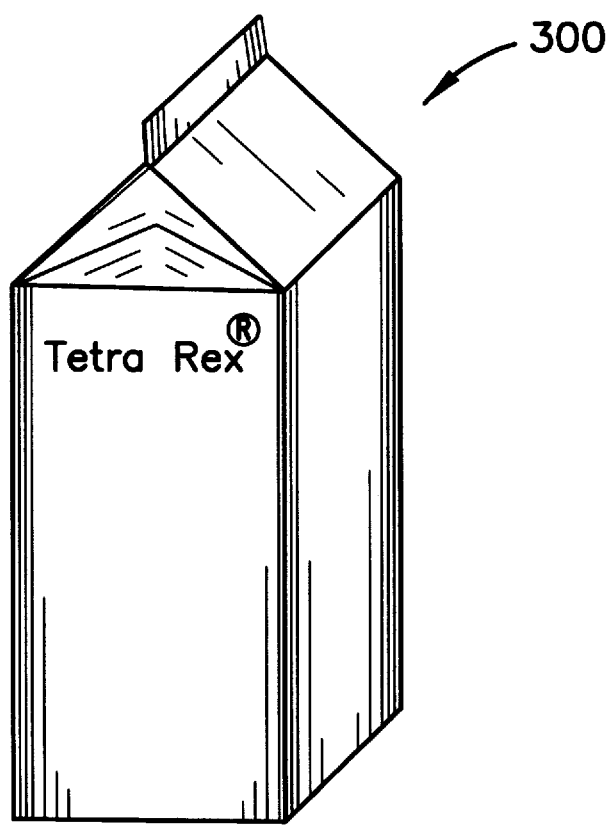
Figure 6B:
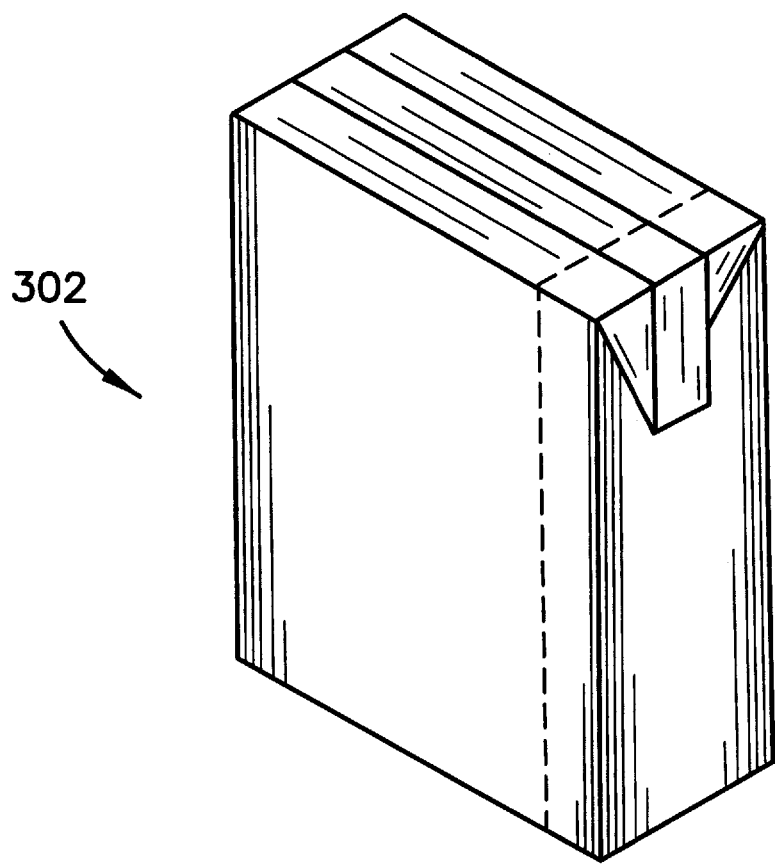
Figure 6C:
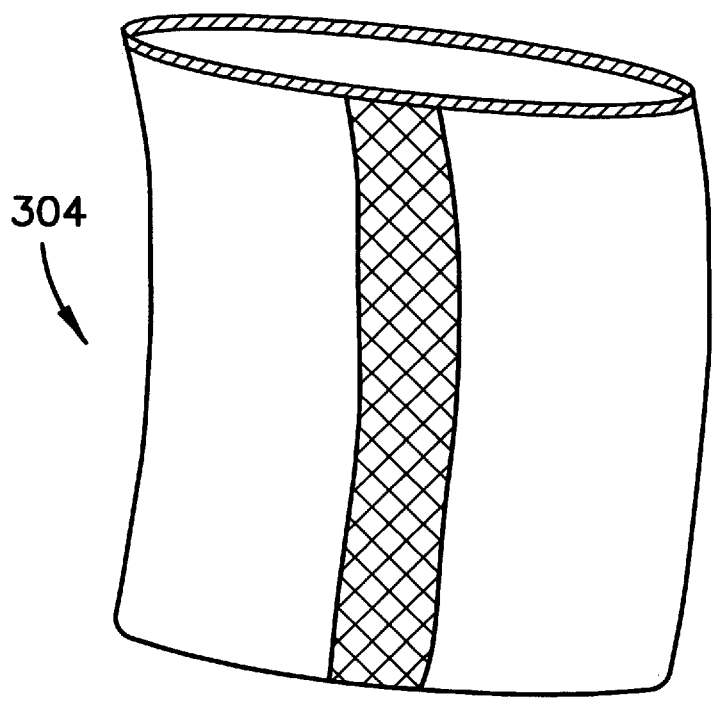

There is illustrated in FIG. 2 a schematic diagram of an alternative embodiment of the present invention;

There is illustrated in FIG. 3 a schematic diagram of still another alternative embodiment of the present invention;

There is illustrated in FIG. 4 a schematic diagram of yet another alternative embodiment of the present invention;

There is illustrated in FIG. 5 a flow diagram of a method of the present invention;

There is illustrated in FIGS. 6A–6C several packages in which the shelf-stable product produced according to the present invention may be packaged.

DETAILED DESCRIPTION OF THE INVENTION

As mentioned above, the problem of "overcooking" of a heterogeneous food has just recently become a problem due to the recent FDA approval of a thermal processing system for a heterogeneous food. The process that was approved by the FDA is disclosed in parent application, U.S. patent application Ser. No. 08/667,124, filed on Jun. 20, 1996 for a Process And Article For Determining The Residence Time Of A Food Particle U.S. Pat. No. 3,750,907, and in subsequent applications, U.S. patent application Ser. No. 08/722,441 filed on Sep. 9, 1996 and U.S. patent application Ser. No. 08/769,811 filed on Dec. 19, 1996 U.S. Pat. No. 5,739,437, all of which are hereby incorporated by reference.

The overall processing system 10 is shown in FIGS. 1–4. The overall processing system 10 includes a first processing system 12, generally for the heterogeneous food, and a second processing system 14 for processing the carrier fluid. In a preferred embodiment, the heterogeneous food 16 is a soup and the carrier fluid 18 is a thermal sensitive component of soup such as milk. The carrier fluid may be any thermal sensitive portion of the final heterogeneous food product. However, those skilled in the pertinent art will recognize that other heterogeneous foods and other carrier fluids are well within the scope and spirit of the present invention.

The first processing system 12 also includes mixing of the carrier fluid for cooling of the heterogeneous food 16. The heterogeneous food 16 is placed into a pump 20 for moving the heterogeneous food 16 through the system 12. The food 16 is pumped to a preheater 22 through tubing 24 where it is heated to a first predetermined temperature depending on the food. For example, if the food 16 is potato soup, then the first predetermined temperature is approximately 99° C. The food 16 is then pumped through tubing 24 to a final heater 26 for heating to a final temperature before entering the holding tube 30. If the food 16 is potato soup, the soup is heated to a temperature of 130° C. The food 16 is then pumped to the holding tube 30 where it must reside for a predetermined time at the final predetermined temperature in order to effect sterilization of the food 16. If the food 16 is potato soup, then the fastest particle of potato must reside in the holding tube 30 for a minimum of 230 seconds. The residence time of a food particle in the holding tube is the subject of the previously mentioned copending patent applications which disclose the process that was approved by the FDA.

Referring now to the second aseptic processing system 14, although the description of the first processing system 12 is not completed, the carrier fluid 18 is placed into a PC pump 38 for moving the carrier fluid 18 through the second aseptic processing system 14. As mentioned above, the carrier fluid 18 preferably is milk, however, other homogeneous foods which may be used for cooling are well within the scope and spirit of the present invention.

The fluid 18 is pumped through tubing 24 to a regenerative heat exchanger 40 where the fluid 18 is heated to a predetermined temperature. The fluid is then moved to a holding tube 44 where steam is injected into the system by a steam injector 42. The fluid is held in the holding tube 44 for a predetermined period. If the fluid 18 is ultra-high temperature ("UHT") milk, then the predetermined temperature is 280° C. and predetermined time period is 6.6 seconds.

Figure 1:
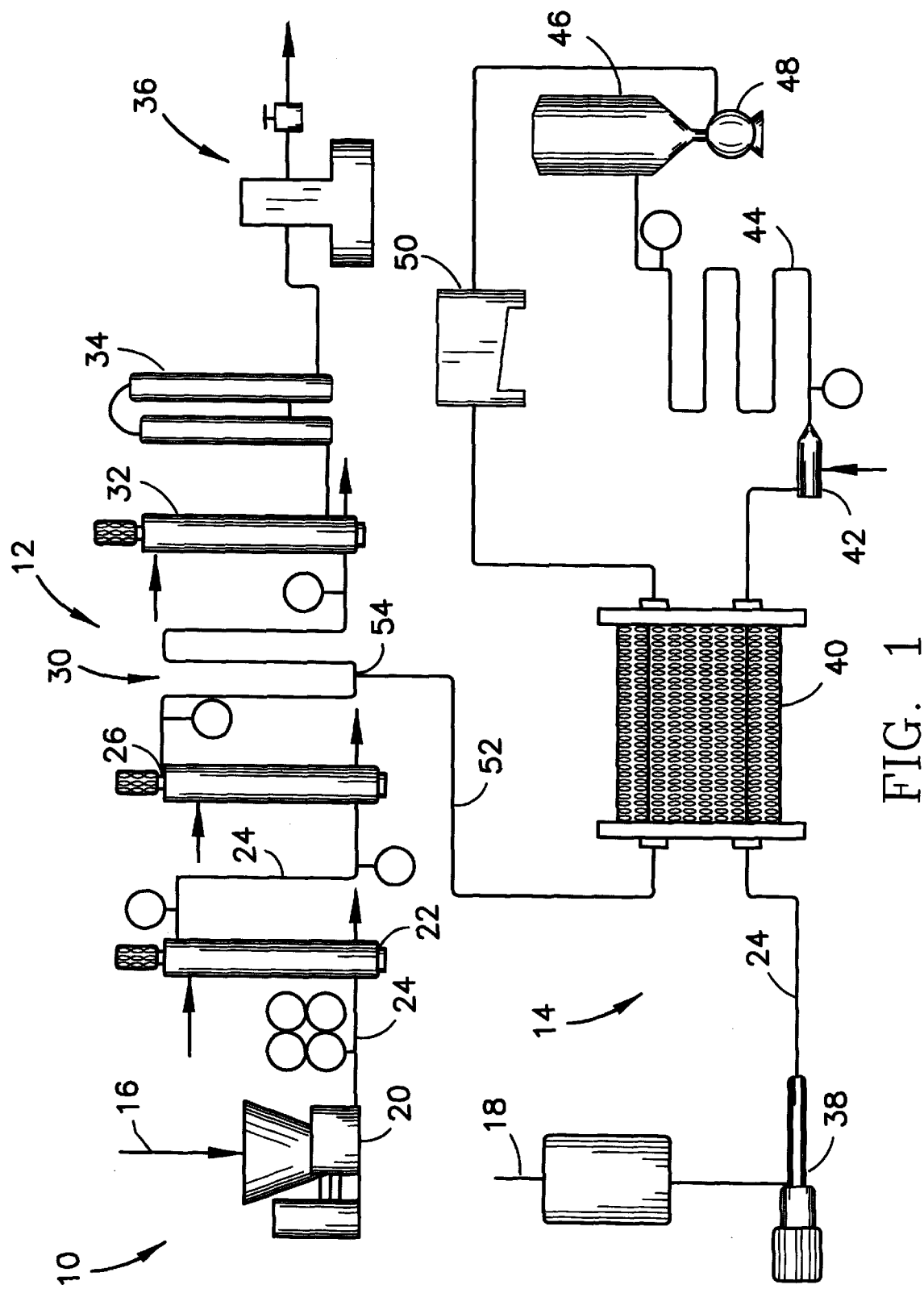

In FIGS. 1 and 2, the carrier fluid 18 is then pumped to a flash cooler 46 for rapidly decreasing the temperature of the carrier fluid 18. If the carrier fluid 18 is UHT milk, then the milk is reduced to a temperature of 75° C. in the flash cooler 46. A pump 48 may be used to further pump the carrier fluid 18 from the flash cooler 46 to the homogenizer 50. At the homogenizer 50, the carrier fluid 18 is further homogenized. In the alternative embodiment illustrated in FIG. 3, the carrier fluid 18 is pumped directly from the holding tube 44 to the homogenizer 50 with the greater portion of the cooling of the carrier fluid 18 occurring at the heat exchanger 40. In this embodiment, the optional flash cooler 46 is removed from the process. In the alternative embodiment illustrated in FIG. 4, the carrier fluid 18 is pumped directly from the holding tube 44 to the heat exchanger 40 with the greater portion of the cooling of the carrier fluid 18 occurring at the heat exchanger 40. In this embodiment, both the flash cooler 46 and the homogenizer 50 are removed from the process. It is also within the present invention to have only the homogenizer 50 removed while still having the flash cooler 46 cool the carrier fluid 18 as it is pumped from the holding tube 44.

Next, the carrier fluid 18 is pumped to the heat exchanger 40 to further cool the carrier fluid. A more thorough disclosure of one possible method and apparatus for producing the carrier fluid is described in Arph et al, U.S. Pat. No. 5,443,857 for a Method And Apparatus For Continuous Sterilization Of A Liquid Milk Based Product which relevant parts are hereby incorporated by reference. Yet another disclosure of a possible method and apparatus for producing the carrier fluid is described in Sollerud, U.S. Pat. No. 3,973,048 for a Method For Sterilizing Liquids By Brief Heating which relevant parts are hereby incorporated by reference.

The carrier fluid 18 is then combined with the heterogeneous food 16 through tubing 52 which connects the first and second processing systems 12 and 14. The tubing 52 may be connected at either an injection point 54 as shown in FIG. 1 or at an injection point 54a shown in FIG. 2. Also, although FIGS. 3 and 4 only show the tubing connected at injection point 54a, it is well within the present invention to have these embodiments connected at injection point 54 as shown in FIG. 1. As shown in FIG. 1, the injection point 54 is within the holding tube 30, and thus the carrier fluid 18 is combined with the heterogeneous food 16 in the holding tube, however after the necessary predetermined residence time at the predetermined temperature for the particular heterogeneous food 16. As shown in FIG. 2, the injection point 54a is disposed after the holding tube 30. The carrier fluid 18 acts to rapidly cool the heterogeneous food 16 from the predetermined temperature in the holding tube. In this manner, the carrier portion of the final heterogeneous food product is not overheated and the heterogeneous food 18 is itself not overcooked. The combined final product 60 is then further cooled in a precooler 32. For example, if the product is cream of potato soup, the precooler will cool the product to a temperature of 83° C. Then, the final product 60 is pumped to a final cooler 34 where the final product 60 is cooled to a temperature of 21° C. The final product is then pumped to a filling and packaging machine for aseptic packaging of the product. A possible aseptic filler for use in practicing the present invention is described in Rigndahl et al, U.S. Pat. No. 4,874,021 for Aseptic Filling Unit For Packing Machines For Long-Lasting Products With Fluid Behavior which relevant parts are hereby incorporated by reference. As illustrated in FIGS. 6A–6C, the final product may be aseptically packaged in various packaging including gable-top cartons 300 (FIG. 6A), parallelepiped containers 302 such as the TETRA BRIK® Aseptic container (FIG. 6B), flexible pouches 304 such as the TETRA POUCH™ (FIG. 6C), blow molded bottles, and the like. The overall system 10 may be connected to the particular packaging machine for producing the above-mentioned packages.

A general method for the present invention is illustrated in FIG. 5. At step 100, a heterogeneous food is introduced into an aseptic processing system. Aseptic processing is generally defined as a process which renders a food free of microorganisms of public health significance, and prevents the growth of any microorganism under normal nonrefrigerated storage and distribution thereby creating a commercially sterile food. For example, if the desired final heterogeneous food product is potato soup, then the soup is divided between a thermal sensitive component, milk, and the heterogeneous food, potato particulates and starch. The heterogeneous food is introduced into a first aseptic processing system.

At step 102 the heterogeneous food is heated to a predetermined temperature. At step 104 the heated heterogeneous food is held for a predetermined residence time in a holding tube which results in the sterilization of the heterogeneous food. At step 106, a carrier fluid is combined with the heterogeneous food subsequent to the predetermined residence time. This may occur at any number of locations, with the only true limitation being that the solid food particulate be subject to the predetermined temperature for the predetermined residence time. Thus, the combination of the carrier fluid with the heterogeneous food may even occur during the predetermined residence time as long as the carrier fluid does not reduce the temperature of the particulate of the heterogeneous food below the predetermined temperature during the predetermined residence time. For example, if the carrier fluid is added in an amount and at a temperature which would not lower the temperature of the particulate of the heterogeneous food below the predetermined temperature, then the combination may occur early on in the holding tube. However, if the carrier fluid is much cooler than the heterogeneous food then this combination should occur after the predetermined residence time. The location of the combination will vary depending on the final heterogeneous food product, and its components.

At step 108, the final heterogeneous food product is cooled to a temperature below that of the combination temperature. This may occur at multiple stations along the processing system. At step 110, the final heterogeneous food product is aseptically packaged for further distribution. The final heterogeneous food product may be a shelf stable product similar to canned soup.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. An apparatus for producing a heterogeneous pumpable food composed of a concentrated pumpable heterogeneous food and an aseptic carrier fluid, the apparatus comprising:
   a first aseptic processing system comprising
      a first pump for pumping the concentrated pumpable heterogeneous food through the first aseptic processing system,
      a first heater for heating the concentrated pumpable heterogeneous food to a first predetermined temperature, the first heater in flow communication with the first pump,
      a first holding tube for maintaining the concentrated pumpable heterogeneous food at the first predetermined temperature for a predetermined time period, the first holding tube in flow communication with the first heater, the first holding tube having an inlet for receiving the concentrated pumpable heterogeneous food,
      a first cooler for reducing the temperature of the heterogeneous pumpable food, the first cooler disposed subsequent to and in flow communication with the first holding tube, the first cooler having an inlet for receiving the concentrated pumpable heterogeneous food;
   a second aseptic processing system for producing an aseptic carrier fluid, the second aseptic processing system comprising
      a second pump for pumping the carrier fluid through the second aseptic processing system,
      a second heater for heating the carrier fluid to a second predetermined temperature, the second heater in flow communication with the second pump,
      a second holding tube for holding the heated carrier fluid at the second predetermined temperature for a second predetermined residence time, the second holding tube in flow communication with the second heater, and
      a second cooler for reducing the temperature of the carrier fluid, the second cooler in flow communication with the second holding tube; and
   a tubing connected between the second cooler and the first aseptic processing system, the tubing connected to the first aseptic processing system at an injection point disposed between the inlet to the first holding tube and the inlet to the first cooler, the tubing allowing for flow communication between the second cooler and the first aseptic processing system.

2. The apparatus according to claim 1 further comprising an aseptic packaging machine for packaging the final heterogeneous food product.

3. The apparatus according to claim 1 further comprising a homogenizer for homogenizing the carrier food product.

4. The apparatus according to claim 1 wherein the injection point is within the holding tube.

5. The apparatus according to claim 1 wherein the injection point is subsequent to the first holding tube.

6. The apparatus according to claim 1 wherein the first and second heaters and the first cooler are heat exchangers.

7. The apparatus according to claim 1 further comprising a third heater disposed prior to the first heater within the first aseptic processing system.

8. The apparatus according to claim 1 wherein the carrier food product is a thermal sensitive component of the final heterogeneous food product.

* * * * *